United States Patent

[11] 3,599,793

| [72] | Inventor | Anthony J. Arbini<br>Novato, Calif. |
|---|---|---|
| [21] | Appl. No. | 23,427 |
| [22] | Filed | Mar. 27, 1970 |
| [45] | Patented | Aug. 17, 1971 |
| [73] | Assignee | McCormick & Company, Inc.<br>Cockeysville, Md. |

[54] DISPENSER FOR CHOPPED VEGETABLES HAVING ROTARY BLADE AGITATOR
9 Claims, 6 Drawing Figs.

[52] U.S. Cl. .................................................. 210/152, 222/324, 222/41 D
[51] Int. Cl. .................................................. C02c 1/00
[50] Field of Search.......................................... 222/325, 233—236, 323, 324, 342, 465, 471, 473, 410; 210/152, 244, 470

[56] References Cited
UNITED STATES PATENTS
| 2,650,485 | 9/1953 | La Greca | 210/244 X |
| 3,227,461 | 1/1966 | Love, Jr. | 222/473 X |
| 3,392,845 | 7/1968 | Shapira et al. | 210/470 |

FOREIGN PATENTS
| 1,072,947 | 9/1954 | France | 222/175 |

*Primary Examiner*—Robert B. Reeves
*Assistant Examiner*—David A. Scherbel
*Attorney*—Cushman, Darby & Cushman ABSTRACT: The dispenser includes a base having an inclined bottom wall provided with at least one array of vaned slots circumscribed by a chute, the base further includes a handle provided with a pistol grip which encloses an air motor whose reciprocating element drives a blade unit disposed on the upper surface of the bottom wall. A canister mounted on the base supplies batches of chopped succulent vegetable material, such as reconstituted chopped onions, to the base. The device is especially useful, when provided with a plurality of dispensing chutes, for accurately and rapidly applying controlled amount of chopped, succulent vegetable material to portion controlled meals in meal preparation assembly lines at limited menu, fast service restaurants.

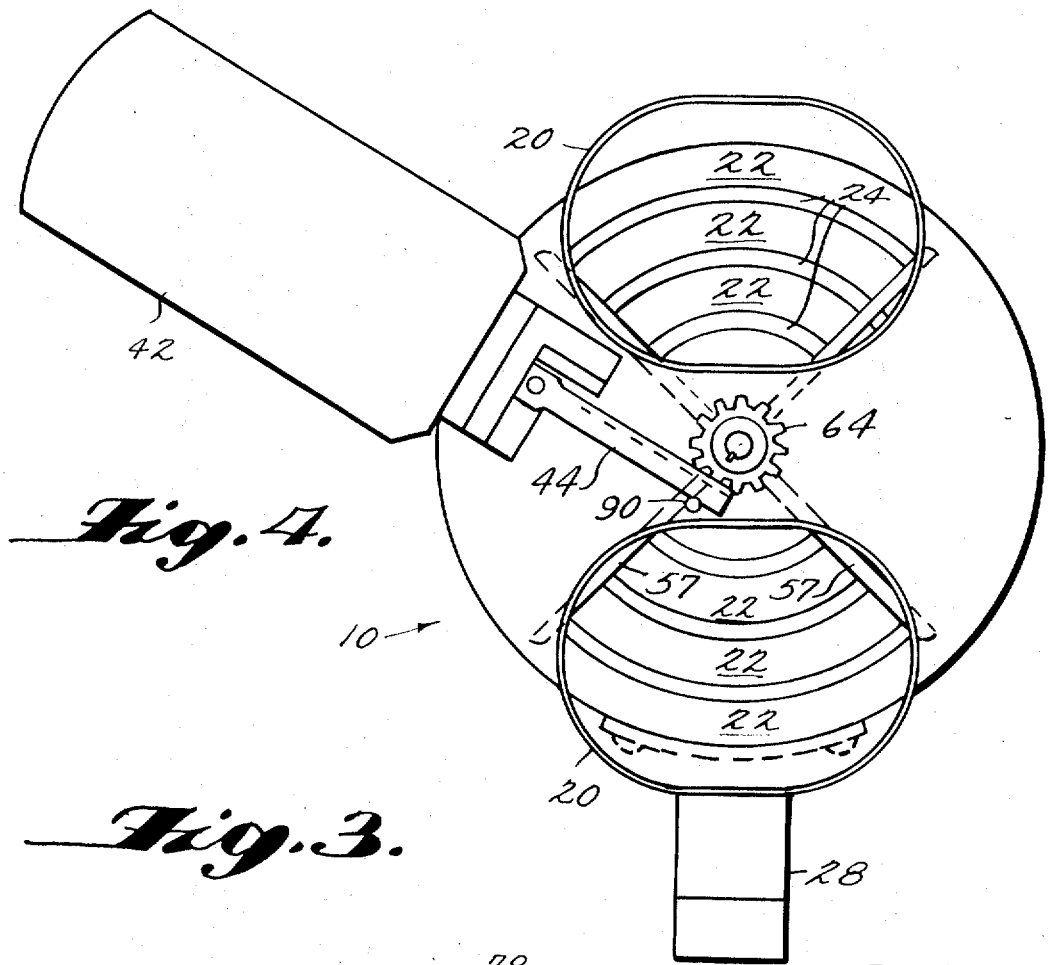
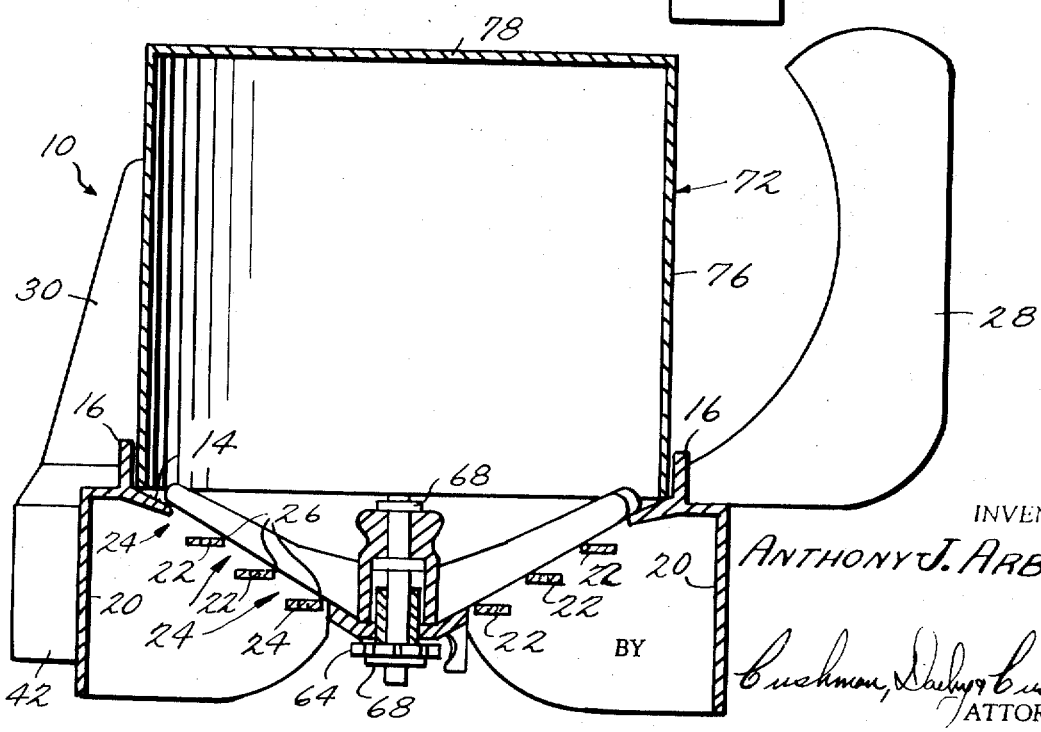

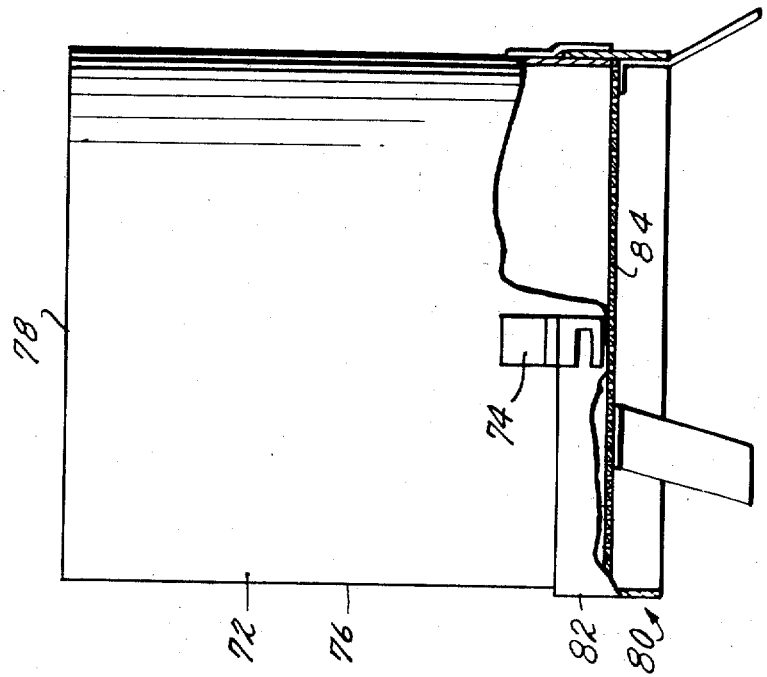
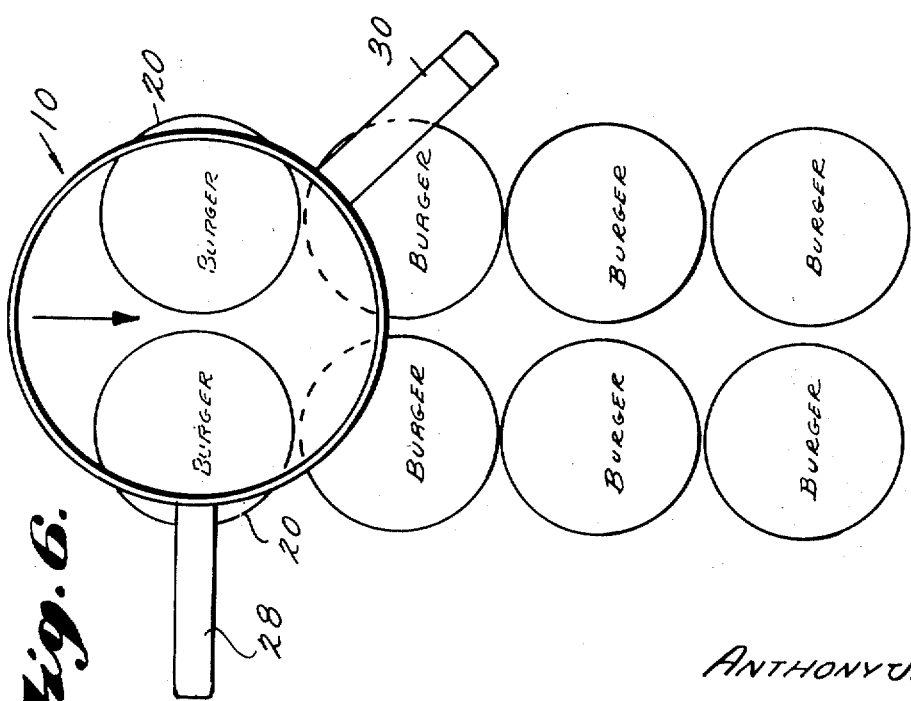

INVENTOR
ANTHONY J. ARBINI
BY
Cushman, Darby & Cushman
ATTORNEYS

3,599,793

DISPENSER FOR CHOPPED VEGETABLES HAVING ROTARY BLADE AGITATOR

FIELD OF THE INVENTION

This invention relates to a dispenser adapted to deliver controlled amounts of chopped vegetable material into predetermined locations, either singly or in multiple deliveries. The dispenser of the present invention has specific utility in delivering the desired amounts into the specified locations as may be the case in the preparation of a large number of meals or portions simultaneously or in the preparation of certain ingredients of meals or in the preparation of high volume food items such as hamburgers, cheeseburgers and the like.

BACKGROUND OF THE INVENTION

In many of these applications it becomes necessary to dispense chopped vegetable matter either as ingredients of salads, or as relishes, or as condiments such as chopped onions, chopped lettuce, chopped cabbage. Such succulent vegetable matter is usually difficult to distribute automatically or mechanically because it is sticky in nature and the particles tend to adhere and not flow regularly or freely. Since they frequently contain water or juices, they cannot be propelled with the application of force without removing and losing from them undesirable amounts of liquid or juice. Increased pressures are also undesirable for use as a propelling system because the succulent particles tend to become crushed.

Mechanical devices for distributing and dispensing such items are not generally available and in many food preparation operations, the necessary ingredient must be distributed manually. This is time consuming, lacks accuracy as to the amount that is dispensed and is not sanitary.

SUMMARY OF THE INVENTION

The apparatus of the present invention is capable of delivering the succulent food ingredient directly to the food item or plate containing the food item; it does so with great uniformity and at a high rate of speed which is compatible with many of the high-speed food preparation operations prevailing in food commissaries and restaurants and roadside stands.

The apparatus of the invention is also economically attractive as a labor saving device; it is highly sanitary and eliminates possible direct contamination and health hazards.

The dispensing unit of the preferred embodiment of the invention includes three components: a canister in which the chopped vegetable is contained and which can also be used to reconstitute dehydrated vegetables prior to their use; a screen to serve as a temporary cover for the canister while excess water is removed from reconstituting vegetables; a dispensing unit which when in operation constitutes the base of the dispenser and contains a propelling mechanism that activates reciprocating blades that move the chopped succulent vegetable matter through a series of controllable openings in the desired direction and in the desired amount.

In the preferred embodiment, the dispenser includes a base having an inclined bottom wall provided with at least one array of vaned slots circumscribed by a chute, the base further includes a handle provided with a pistol grip which encloses an air motor whose reciprocating element drives a blade unit disposed on the upper surface of the bottom wall. A canister mounted on the base supplies batches of chopped succulent vegetable material, such as reconstituted chopped onions to the base. The device is especially useful, when provided with a plurality of dispensing chutes, for accurately and rapidly applying controlled amounts of chopped, succulent vegetable material to portion controlled meals in meal preparation assembly lines at limited menu, fast service restaurants.

The amount of vegetable matter to be delivered can be controlled by the stroke length of a drive rod which moves the reciprocating blades, by the distance between vanes in the delivery chutes and the angle of these vanes in relation to the dish of the dispenser base.

The principles of the invention will be further hereinafter discussed with reference to the drawings wherein a preferred embodiment is shown. The specifics illustrated in the drawings are intended to exemplify, rather than limit, aspects of the invention as defined in the claims.

BRIEF DESCRIPTION OF THE DRAWINGS

FIG. 3 is a longitudinal, vertical sectional view of the dispenser, including the canister, taken substantially along line 3–3 of FIG. 1;

FIG. 4 is a bottom plan view of the dispenser;

FIG. 5 is a side elevation view of the canister resting on a drain screen; and

FIG. 6 is a schematic top plan view showing use of the dispenser in an assembly line sandwich preparation operation.

DESCRIPTION OF THE PRESENTLY PREFERRED EMBODIMENT

Figures 1, 2:
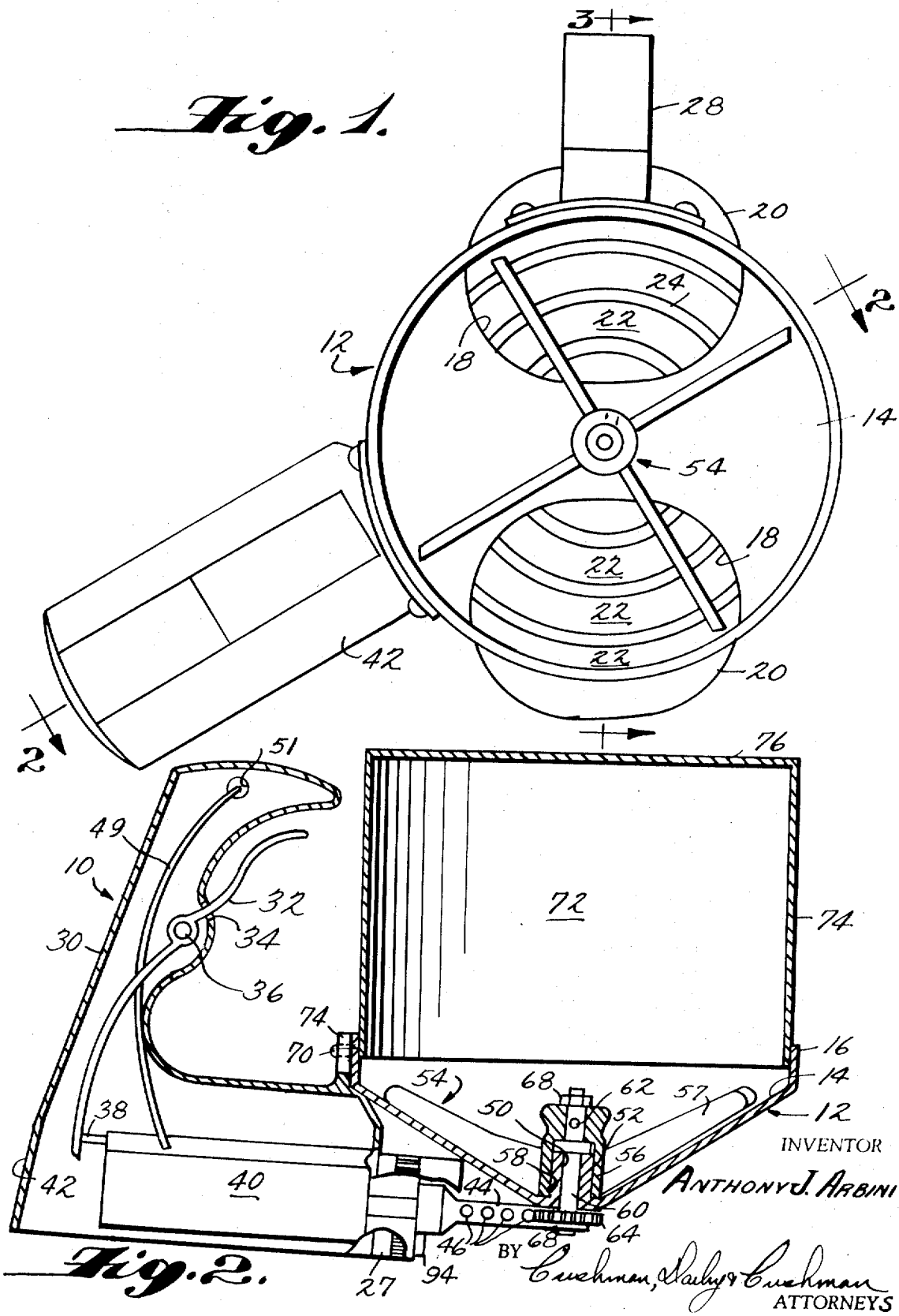
FIG. 1 is a top plan view of the dispenser base.
FIG. 2 is a longitudinal, vertical sectional view of the dispenser including the canister, taken substantially along line 2–2 of FIG. 1.

The dispenser 10 includes a base 12 having a generally conical bottom wall 14, whose central region is lowermost, and a peripheral, upstanding tubular sidewall having an upper edge 16. In the embodiment shown, there are two diametrically opposed somewhat oval-shaped openings 18 through the bottom wall 14. A chute 20 surrounds each opening and projects downwardly therefrom. Each chute upper end is peripherally secured to the bottom wall 14. A plurality of vanes 22 is mounted in the top of each chute. The vanes are narrow radially of the dispenser base 12 and elongated angularly of the dispenser base. The vanes within each chute are spaced from one another radially of the dispenser base to define dispensing slots 24. In the preferred form shown the vanes have pivot pins extending from each end thereof by which the vanes are stiffly mounted in corresponding opposed openings in the respective chutes. Accordingly, the angle of canting of the vanes which determines the trajectory of the dispensed portions of vegetable material, may be adjusted. In instances where the dispenser is uniformly used to dispense a uniform product onto uniformly spaced means. The vanes may be stationarily mounted on the chutes or base bottom wall. Preferably the upper edges 26 of the vanes 24 lie in or slightly below the conical plane of the upper surface of the base 12 bottom wall.

A first inverted pistol grip handle 28 is secured to the base at a 9 o'clock position thereon. A second inverted pistol grip handle 30 is secured to the base 12 at 4:30 o'clock position thereon in the illustrated embodiment. The handle 30 includes within its upper, vertical extent a trigger 32 which is exposed for actuation through an opening 34 in the handle. Within the handle 30, the trigger is pivoted at 36 and has an end, beyond the pivoted mounting, arranged to depress the actuator button 38 of a small, conventional air motor 40 mounted horizontally within a lower part 42 of the handle. The horizontal portion of the handle proceeds radially of the base 12 to a point just below the bottom wall 14, and radially adjacent the central portion of the bottom wall. A notched drive rod 44 protrudes from the inner end of the horizontal portion 42 of the handle. As shown the drive rod includes a plurality of laterally opening, axially spaced notches or openings 46. Upon actuation of the trigger 32, the drive rod reciprocates in an extending sense, upon relaxation of the trigger 32 the drive rod reciprocates in a retracting sense.

Compressed gas for powering the air motor is supplied through a flexible tube 49 which exits from the hollow handle at 51.

It should now be noticed that the central portion of the bottom wall is provided with a coaxially located opening 50 fitted with a sleeve bearing 52 having a vertical axis coincident with that of the opening 50. (In the embodiment shown the sleeve bearing is integrally formed with the base bottom wall.)

Within the base, a blade unit 54 comprising a hub 56 and a plurality (e.g. four) radiating blades 57 is received on the sleeve bearing 52 via a cylindrical socket 58 in the hub. The cone angle of the lower extent of the blades 57 is equal to that of the upper surface of the base 12 bottom wall which the blades lightly engage. A rod axle 60 is journaled in the sleeve bearing opening 50 and has the blade unit hub keyed to it within the base at 62. Below the base bottom wall 14, a toothed sprocket 64 is keyed on the rod axle 60 at 66. Nuts 68 threaded onto opposite ends of the rod axle secure the blade unit and sprocket thereon. These allow further disassembly of the dispenser 10 for cleaning.

The teeth on the sprocket 64 engage the notches of the drive rod 44, so that when the air motor is triggered and released the sprocket shaft and blade unit are turned a predetermined amount.

Near the upper extent of the base unit sidewall, clips 70 are provided for removably securing a canister 72 to the base 12. Cooperating clips 74 are provided on the tubular sidewall 76 of the canister 72. The canister is completed by a disk-shaped top wall 78 peripherally joined to the upper extent of the canister sidewall.

As an accessory enabling more efficient use of the dispenser when the material to be dispensed must first be reconstituted from a dry state, there is provided a draining stand 80 which comprises an axially short tubular collar 82 bridged intermediate its axial extent by a horizontal screen 84. A plurality of short legs secured to the collar provide for supporting the stand an inch or so above any support surface. The internal diameter of the collar 82 is slightly greater than the external diameter of the tubular sidewall of the canister 72 near the lower extent of the canister.

A drive rod guide pin 90 holds the drive rod in alignment, as shown, pressed against the sprocket 64. The distance which the drive rod 44 travels can be adjusted by turning the collar 27 which is part of the conventional air motor.

USE OF THE APPARATUS

A typical operation will now be described using the dispenser 10 to emplace charges of reconstituted dehydrated chopped onion on hamburger buns.

The canister 72, separated from the base 12, is inverted and filled about three-quarters full of dehydrated chopped onions. The draining stand 80 is then inverted an fitted onto the canister (the resulting arrangement appears as FIG. 5 would, if inverted). The canister is filled almost completely with water and allowed to reconstitute for about 20—30 minutes. Salt, pepper, spices and other condiments may be added to the dehydrated product or to the reconstituting mixture. To drain off excess water, the canister and draining stand are inverted together over a sink, set down and allowed to drain for at least 10 minutes with occasional shaking. Then the assembly 72, 80 is inverted again, the draining stand 80 removed, the base unit 12 inverted and secured to the inverted canister. The assembly 72, 12 may then be turned right side up for use. The procedure just outlined may seem a little awkward, but in practice more than one canister 72 is preferably used, so one may be in use on the base 12, another may have a batch of reconstituted chopped onions therein and being stored in the refrigerator until the canister in use is exhausted, and another canister may be holding a batch of reconstituted chopped onions.

The dispenser 10 line 49 is connected to a source of compressed gas such as air, nitrogen or carbon dioxide. The amount of chopped succulent vegetable material dispensed during one actuation of the trigger varies with the gas pressure used, but this is a matter of easy calibration. For a Clippard, Model 7SD-1 (cylinder) and Model MAV-4 Mav-4 (valve) air motor, both available from Power Mac, Inc. of San Francisco, California, a gas pressure of 50—60 p.s.i.g. is recommended. Once the adjustment of pressure has been made it need not be changed unless a decision is made to dispense a different quantity of vegetable material into each meal.

With reference to FIG. 6, the hamburgers to be provided with chopped onion, or the empty half-rolls therefore are arrayed in a longitudinal line of lateral groups of two adjacent ones. with with the dispenser angularly oriented a shown in FIG. 6 and centered over the line, the dispenser is moved down the line about ½ to 1 inch above the buns or burgers and the trigger pulled once and released as the dispenser moves over each lateral group of two patties or buns.

Pulling the trigger allows the compressed gas to enter the propulsion cylinder valve assembly (air motor) through the supply line. This propels the notched drive rod 44 forward for a distance regulated by the stroke adjustment collar 27, after which the drive rod returns to its retracted position determined by the return stop 94. On its forward and return movement, the notches of the drive rod are firmly engaged with the teeth of sprocket 21 imparting to it a reciprocating movement which is fully transmitted to the reciprocating blades on the inside of the dispenser base 12.

The movement of the blades sweeps onion particles through the spaces between the vanes into the delivery chutes which control the placement of the onions onto the buns or meat patties with a minimum of scatter.

Gravity and the slight jarring action of the reciprocating blades keep the bulk of the chopped onions moving downward toward the chutes which remain evenly supplied until the canister is empty and is either refilled or replaced with a full canister.

The amount dispensed can be controlled by the size of the openings between the vanes, the angle of the vanes and the distance travelled by drive rod which in turn controls the sweep of the reciprocating blades.

When necessary, the dispenser may be disconnected from the compressed gas supply, disassembled and cleaned with hot detergent solution in accordance with local health department regulations.

The device 10 thus provides for sanitary handling, preparation and distribution of succulent chopped vegetable material, can deliver controlled amounts with accurate placement and minimal waste and is susceptible of easy use in high volume, assembly line food preparation areas, such as those of roadside, franchised, limited menu, takeout restaurants.

Various modifications or additions to the basic device shown are contemplated. For instance the device 10 may be suspended from overhead so the operator does not need to support its weight, but only needs to guide it. The trigger may be modified to extend downwardly an amount such that contact between the trigger and the surface on which the patties or buns are supported actuates the air motor. With such modification it can be assured that the optimum height of the dispenser over the buns or patties is maintained.

The buns or patties slated to receive charges of chopped succulent vegetable material may each first be surrounded by a paper collar to assist in preventing spillage of dispensed charges.

The preferred angles for the vanes and dispenser base bottom wall cone are as depicted in the drawings.

The chutes, vanes and openings therefor may be provided in greater or lesser number and relative size, and the chutes may be made so as to detach.

Although the separable canister is preferred, a top loading integral canister could be substituted where reconstitution of the vegetable material is not contemplated. The relative size of the canister may be changed, for instance increased.

Examples of other succulent, chopped vegetable materials which may be dispensed with the apparatus of the invention include chopped lettuce, chopped cabbage, cole slaw, chopped sauerkraut, pickle relish and chopped chillies.

It should now be apparent that the metering dispenser for chopped succulent vegetable matter as described hereinabove possesses each of the attributes set forth in the specification under the heading "Summary of the Invention" hereinbefore. Because the metering dispenser for chopped succulent vegetable matter of the invention can be modified to some extent without departing from the principles of the invention as they have been outlined and explained in this specification, the present invention should be understood as encompassing all such modifications as are within the spirit and scope of the following claims.

What I claim is:

1. A metering dispenser for chopped succulent vegetable matter comprising:
    a base means defining a bottom wall having a generally conical, centrally depressed upper surface;
    means defining a central opening through said bottom wall;
    means defining at least one other opening through said bottom wall radially displaced from the center thereof;
    an array of radially spaced angularly extending vanes mounted in said other opening to define a plurality of slots elongated angularly of said bottom wall;
    said base further including a handle, means defining a pistol grip including a trigger on said handle;
    an air motor having a reciprocable plunger element extending therefrom, said trigger being connected to said air motor for controlling reciprocation of said plunger;
    a bladed distributor disposed on the upper surface of said bottom wall and having a central portion thereof projecting down through said center opening and mounting an element engageable below said bottom wall, with said plunger for advancing said bladed distributor upon actuation of said trigger;
    a canister mounted on said base and constructed to contain a batch of chopped succulent vegetable matter in open communication with said bottom wall upper surface, whereby a controlled quantum of chopped succulent vegetable matter may be accurately dispensed in a desired direction through the slots in said array of vanes upon each actuation of said trigger.

2. The metering dispenser of claim 1 wherein said pistol grip houses said air motor except for said plunger thereof which protrudes from said pistol grip.

3. The metering dispenser of claim 1 further including:
    a second other opening through said bottom wall radially displaced from the center thereof and angularly displaced from the first-mentioned other opening;
    an array of radially spaced angularly extending vanes mounted in said second other opening to define a second plurality of slots elongated angularly of said bottom wall, said blade distributor being arranged to sweep over said second other opening upon actuation of said trigger to accurately dispense a controlled quantum of chopped succulent vegetable matter through said second other opening.

4. The metering dispenser of claim 3 wherein said canister is attachable to and detachable from said base and further including said means on said canister for detachably securing said canister to said base.

5. The metering dispenser of claim 3 wherein said bladed distributor and said first and second other openings are cooperatively angularly arranged to provide simultaneous dispensing of a quantum of chopped succulent vegetable matter through each plurality of slots upon each actuation of said trigger.

6. The metering dispenser of claim 5 further comprising two separate chutes connected to said base and each circumscribing a respective other opening through said bottom wall.

7. The metering dispenser of claim 6 further including means mounting said vanes said chutes at the upper extents of said chutes for adjustable tipping of said vanes to provide angular adjustment of dispensing from said chutes.

8. The metering dispenser of claim 5 wherein said canister includes a disk-shaped end wall and a tubular sidewall joined to the periphery of said end wall, said canister having an open end opposite said end wall for presentment toward said base.

9. The metering dispenser of claim 8 further including a drain stand for said canister while detached from said base, said drain stand including tubular collar;
    a screen bridging said collar intermediate the axial extent thereof; and
    a plurality of depending legs secured to said collar for supporting said collar above the lower extent of said legs;
    said collar above said screen having an internal diameter at least slightly longer than the external diameter of said canister adjacent the open end of said canister whereby said drain stand may be inverted, placed over the open end of said canister when while detached and inverted, and the resulting assembly inverted to dispose the canister and drain screen right side up for draining of chopped succulent vegetable matter through said screen.